US010514771B2

(12) United States Patent
Xie et al.

(10) Patent No.: US 10,514,771 B2
(45) Date of Patent: *Dec. 24, 2019

(54) INPUTTING RADICAL ON TOUCH SCREEN DEVICE (71) Applicant: Microsoft Technology Licensing, LLC, Redmond, WA (US)

(72) Inventors: Mingyang Xie, Beijing (CN); Chiwei Che, Beijing (CN); XiXi Chen, Beijing (CN); Byron Changuion, Beijing (CN); Jacky Chen, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 674 days.

This patent is subject to a terminal disclaimer.

(21) Appl. No.: 15/001,369

(22) Filed: Jan. 20, 2016

(65) Prior Publication Data
US 2016/0132128 A1  May 12, 2016

Related U.S. Application Data (63) Continuation of application No. 13/555,212, filed on Jul. 23, 2012, now Pat. No. 9,274,609.

(51) Int. Cl.
*G06F 3/01* (2006.01)
*G06F 3/023* (2006.01)
*G06F 3/0488* (2013.01)

(52) U.S. Cl.
CPC ............ *G06F 3/018* (2013.01); *G06F 3/0236* (2013.01); *G06F 3/0237* (2013.01); *G06F 3/04886* (2013.01)

(58) Field of Classification Search
CPC .... G06F 3/018; G06F 3/0237; G06F 3/04886; G06F 3/0236
See application file for complete search history.

(56) References Cited

U.S. PATENT DOCUMENTS 6,562,078 B1  5/2003  Yang et al.
6,847,706 B2 * 1/2005  Bozorgui-Nesbat ........................
  G06F 3/0233
  345/172

(Continued)

FOREIGN PATENT DOCUMENTS

CN  101639734 A  2/2010
EP  0844571 A2  5/1998

(Continued)

OTHER PUBLICATIONS

"Final Office Action Issued in U.S. Appl. No. 13/555,212", dated Jun. 16, 2015, 16 Pages.

(Continued)

*Primary Examiner* — Andrea N Long
(74) *Attorney, Agent, or Firm* — International IP Law Group, PLLC (57) ABSTRACT Example apparatus and methods concern improved input of radicals. Example apparatus and methods facilitate more efficiently inputting Chinese radicals using a touch screen. One example method includes displaying a labeled soft key on a touch screen device. The label may represent all or a portion of a radical. The example method includes accepting a touch input associated with the soft key and then taking an action based on the label and the touch input. The action may include inputting a radical or updating the display on the touch screen. Updating the display may facilitate iterative and intuitive progress through radical construction leading to radical selection and input.

15 Claims, 8 Drawing Sheets

(56) References Cited

U.S. PATENT DOCUMENTS

| | | |
|---|---|---|
| 7,257,528 B1 | 8/2007 | Ritchie et al. |
| 7,508,380 B2 | 3/2009 | Chung |
| 2003/0027601 A1* | 2/2003 | Guo ................... G06F 3/018 |
| | | 455/566 |
| 2003/0212563 A1 | 11/2003 | Ju et al. |
| 2004/0186729 A1* | 9/2004 | Park ................... G06F 3/018 |
| | | 704/276 |
| 2009/0262082 A1 | 10/2009 | Park et al. |
| 2010/0149190 A1 | 6/2010 | Yan et al. |
| 2010/0177971 A1 | 7/2010 | Pardoen |
| 2010/0225599 A1 | 9/2010 | Danielsson et al. |
| 2010/0231523 A1* | 9/2010 | Chou ................... G06F 3/018 |
| | | 345/171 |
| 2010/0275160 A1* | 10/2010 | Im ..................... G06F 3/018 |
| | | 715/810 |
| 2011/0006929 A1* | 1/2011 | Fux ..................... G06F 3/018 |
| | | 341/24 |
| 2011/0068956 A1* | 3/2011 | Tung ................... G06F 3/018 |
| | | 341/28 |
| 2011/0090151 A1* | 4/2011 | Huang ................. G06F 3/0237 |
| | | 345/168 |
| 2011/0161859 A1* | 6/2011 | Zhang ................. G06F 3/018 |
| | | 715/773 |
| 2011/0173558 A1 | 7/2011 | Yeh et al. |
| 2011/0320468 A1 | 12/2011 | Child |
| 2012/0098846 A1* | 4/2012 | Wun ................... G06F 3/018 |
| | | 345/589 |
| 2012/0192110 A1* | 7/2012 | Wu .................... G06F 3/04817 |
| | | 715/815 |
| 2012/0302291 A1* | 11/2012 | Mori .................. G06F 3/018 |
| | | 455/566 |

FOREIGN PATENT DOCUMENTS

| | | |
|---|---|---|
| EP | 2273347 A1 | 1/2011 |
| WO | 2011143808 A1 | 11/2011 |

OTHER PUBLICATIONS

"Non-Final Office Action Issued in U.S. Appl. No. 13/555,212", dated Jan. 6, 2015, 16 Pages.

"Notice of Allowance Issued in U.S. Appl. No. 13/555,212", dated Oct. 23, 2015, 10 Pages.

"International Search Report & Written Opinion Issued in PCT Application No. PCT/US2013/051551", dated Nov. 5, 2013, 10 Pages.

Po, et al., "Dynamic Candidate Keypad for Stroke-based Chinese Input Method on Touchscreen Devices", In Proceedings of IEEE Symposium on Computers & Informatics, Mar. 20, 2011, 6 Pages.

* cited by examiner

INPUTTING RADICAL ON TOUCH SCREEN DEVICE

CROSS REFERENCE TO RELATED APPLICATIONS

This application is a continuation of U.S. patent application Ser. No. 13/555,122 filed Jul. 23, 2012.

BACKGROUND

Mobile computing devices (e.g., smart phones, tablets) with touch screens are used all around the world for an ever increasing number and type of applications. Characters in some languages (e.g., English) are easier to input via a touch screen than are characters from other languages (e.g., Chinese, Japanese). A touch screen is an electronic visual display that can both display items and detect the presence and location of a touch. The touch may be made by a finger, stylus, or other item. A touch screen facilitates interacting directly with what is displayed, rather than interacting indirectly with some other device (e.g., keypad, mouse). Touch screens are used in computers, printers, navigation devices, microwaves, televisions, tablet computers, and other devices.

Practical keypads for inputting English characters through a touch screen device exist. These practical keypads may simply replicate a conventional QWERTY keyboard where there is a one-to-one correspondence between a key on the keyboard and a character. A typical English keyboard may have around eighty keys, a shift key that can effectively double the number of characters, and a control key that can double the number of characters again or allow inputting special characters. Touch screen devices may mimic the shift key and control key, and may also have additional screens of characters that can be input. While this may be practical for English, which has a small closed set of characters, this may not be practical for Chinese characters since there may be over one hundred thousand Chinese characters. Additionally, new Chinese phrases are still being created.

Chinese characters may be, for example, logograms. There are different types of Chinese characters. For example, there are phono-semantic compounds, ideogrammic compounds, pictograms, ideograms, and others. Phono-semantic compounds may also be referred to as radical-phonetic characters. Phono-semantic compounds form the vast majority of Chinese characters. Phono-semantic compounds combine a rebus with a determinative and thus combine a phonetic element (e.g., character with approximately the correct pronunciation) with a radical (e.g., limited number of determinative characters that supply an element of meaning). The radical is usually on one side (e.g., left side), while the phonetic is on the other side (e.g., right), (e.g., 沐 = 氵 "water"+木 mù). The semantic and phonetic elements may also be stacked, (e.g., 菜 = 艹 "plant"+采 cái). Phono-semantic compounds may account for over 80% of Chinese characters. Therefore, there may be over eighty thousand phono-semantic compounds. It is therefore difficult, if even possible, to imagine a one-to-one correspondence keyboard similar to the QWERTY keyboard that could efficiently handle eighty thousand characters.

SUMMARY

This Summary is provided to introduce, in a simplified form, a selection of concepts that are further described below in the Detailed Description. This Summary is not intended to identify key features or essential features of the claimed subject matter, nor is it intended to be used to limit the scope of the claimed subject matter.

Example apparatus and methods recognize that a stroke is the basic element of a Chinese character, that radicals are the basic component of Chinese characters, and that many Chinese characters start with the same radical. Example apparatus and methods also recognize that radicals are input following precise rules that control stroke sequence, stroke position, and the number of strokes. In some examples, hundreds of Chinese characters may share the same start radical. Therefore example apparatus and methods improve efficiency for inputting radicals.

Example apparatus and methods provide different approaches to selecting either a stroke in a radical or an entire radical using fewer actions than conventional systems. For example, a single flick gesture may be used to input a radical, rather than requiring up to ten stroke inputs. Similarly, a single press and hold gesture may be used to input a radical rather than requiring multiple stroke inputs. In one embodiment, a gesture on a stroke may lead to a choice of radicals being displayed in a radical picker. As strokes are added, the radical picker may be updated with different radicals that can then be input using a single gesture. These different embodiments improve the efficiency of inputting Chinese radicals and Chinese characters.

BRIEF DESCRIPTION OF THE DRAWINGS

The accompanying drawings illustrate various example apparatus, methods, and other embodiments described herein. It will be appreciated that the illustrated element boundaries (e.g., boxes, groups of boxes, or other shapes) in the figures represent one example of the boundaries. In some examples, one element may be designed as multiple elements or multiple elements may be designed as one element. In some examples, an element shown as an internal component of another element may be implemented as an external component and vice versa. Furthermore, elements may not be drawn to scale.

DETAILED DESCRIPTION

Chinese characters are written with precise rules that control the number of strokes used to produce a specific character, the placement of each stroke when producing a character, and the order in which strokes are to be made. Phono-semantic compounds are composed of two parts that are drawn separately: a limited set of characters called radicals, and an existing character. This application concerns efficiently inputting a radical.

A radical may be graphically simplified and may suggest the general meaning of a character. A radical is a common sub-element found in different characters. Radicals are found in Chinese hanzi, Japanese kanji, Korean hanja, and in other languages and dialects. Radicals may provide clues to the origin, meaning, or pronunciation of a character.

In Chinese, there are about three hundred radicals, with about one hundred being most commonly used. Even though there are over eighty thousand phono-semantic compounds, fewer are commonly used. For example, one well known Chinese Proficiency Test covers approximately twenty six hundred characters as a test for literacy. While one hundred radicals and twenty six hundred characters are less than eighty thousand characters, one hundred radicals and twenty six hundred characters may still be impractical for conventional one-to-one correspondence keypads, either physical or virtual.

Example apparatus and methods recognize that a stroke is the basic element of a Chinese character. A radical has a fixed stroke sequence. Radicals have from one to seventeen strokes that are performed in a precise order according to rules. Conventional Chinese character input approaches based on stroke sequence recognition have required a user to input the first N strokes of a character until a branch point is reached where a set of possible characters can be presented for selection. However, many characters start with the same radical, and no branch point can be reached until after the entire radical has been entered stroke by stroke. This may be inefficient.

Example apparatus and methods recognize that many Chinese characters have the same start radical. In some examples, hundreds of Chinese characters may share the same start radical. Therefore, example apparatus and methods provide different embodiments for improving the efficiency of inputting radicals. In one embodiment, efficient radical input may be added to existing input method editors.

Some portions of the detailed descriptions that follow are presented in terms of algorithms and symbolic representations of operations on data bits within a memory. These algorithmic descriptions and representations are used by those skilled in the art to convey the substance of their work to others. An algorithm is considered to be a sequence of operations that produce a result. The operations may include creating and manipulating physical quantities that may take the form of electronic values. Creating or manipulating a physical quantity in the form of an electronic value produces a concrete, tangible, useful, real-world result.

It has proven convenient at times, principally for reasons of common usage, to refer to these signals as bits, values, elements, symbols, characters, terms, numbers, and so on. It should be borne in mind, however, that these and similar terms are to be associated with the appropriate physical quantities and are merely convenient labels applied to these quantities. Unless specifically stated otherwise, it is appreciated that throughout the description, terms including processing, computing, and determining, refer to actions and processes of a computer system, logic, processor, or similar electronic device that manipulates and transforms data represented as physical quantities (e.g., electronic values).

Example methods may be better appreciated with reference to flow diagrams. For simplicity, the illustrated methodologies are shown and described as a series of blocks. However, the methodologies may not be limited by the order of the blocks because, in some embodiments, the blocks may occur in different orders than shown and described. Moreover, fewer than all the illustrated blocks may be required to implement an example methodology. Blocks may be combined or separated into multiple components. Furthermore, additional or alternative methodologies can employ additional, not illustrated blocks.

Figure 1:
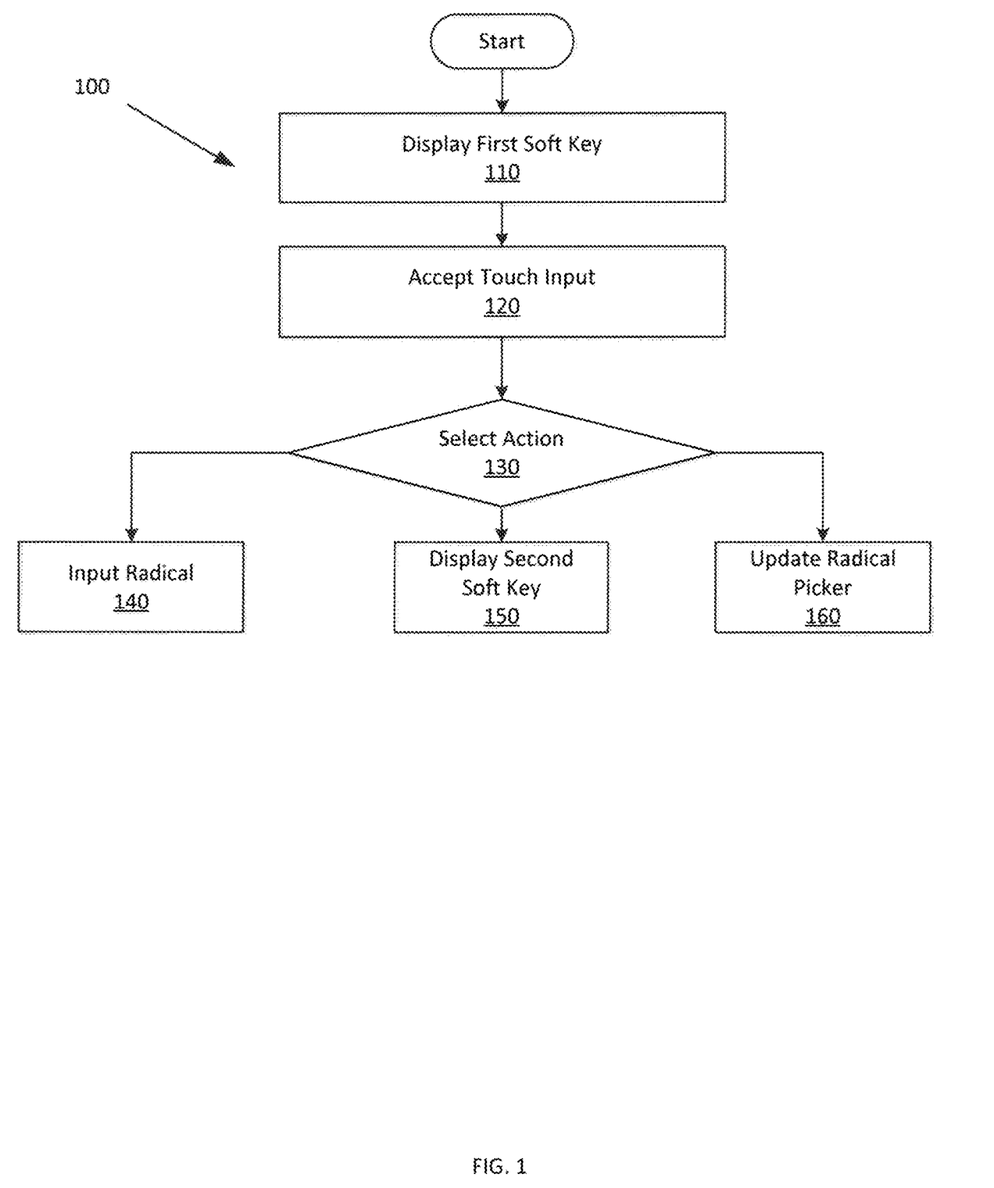
FIG. 1 illustrates an example method associated with inputting a radical on a touch screen device.

FIG. 1 illustrates an example method 100 associated with efficiently inputting a radical on a touch screen device. Method 100 includes, at 110, displaying a first soft key on a touch screen on a touch screen device. In different embodiments the touch screen may be associated with a smart phone, a tablet computer, a laptop computer, an appliance, a personal digital assistant, a game device, or a television. In different embodiments, the radical may be a Chinese radical, a Japanese radical, a Korean radical, or a radical from another language.

The first soft key may be labeled with a first label that represents a portion of a radical. The portion may be a single stroke associated with the radical, two or more strokes, or even the entire radical. While a "soft key" is described, other touch screen input items including, but not limited to, a list, a menu, a scrollbar, and a scrolling list may be labeled and inputs accepted using that touch screen item. The label may be, for example, a single stroke associated with the radical. In one embodiment, the single stroke may be, for example, a Chinese one stroke, a Chinese line stroke, a Chinese dot stroke, a Chinese slash stroke, a Chinese second stroke, or a Chinese hook stroke. In another embodiment, the first label may be a subset of a set of strokes associated with the radical.

Method 100 may also include, at 120, accepting a touch input associated with the soft key. Different apparatus and applications may have different touch screens and different touch screen presentations. Thus, in different examples, the touch input may be a tap, a double tap, a press and hold, a flick, an expand gesture, a contract gesture, or other gesture. Different gestures may lead to different results. For example, an expand gesture may cause the touch screen device to display the second soft key with a second label having more strokes than the first label. Similarly, a contract gesture may cause the touch screen device to display the second soft key with a second label having fewer strokes than the first label. Having both expand and contract gestures facilitates having starting points other than just single stroke radicals. A flick gesture may cause the label on the soft key to be input. Similarly a double tap may cause the label of the soft key to be input.

Method 100 may also include, at 130, selecting an action for the touch screen device to perform. In one embodiment, which action is to be performed is selected based, at least in part, on the first label and the touch input. In another embodiment, the action to be performed is selected based, at least in part on the first label, the touch input, and a state associated with a set of radical stroke input rules.

In one embodiment, the action to be performed may include inputting a radical at 140 or updating the display at 150 or 160. Inputting the radical at 140 may include, for example, inputting the radical into a radical data store. The data store may be, for example, a memory on the touch screen device into which a set of Chinese characters are being collected. The radical data store may also be located off the touch screen device.

Updating the display can take different forms. In one example, at 150, the action to be performed may include displaying a second different soft key labeled with a second different label on the touch screen device. In another example, at 160, the action to be performed may also include updating a set of complete radicals displayed on the touch screen device by a radical picker. In different embodiments, method 100 may include action 150 but not action 160, may include action 160 but not action 150, or may include both actions 150 and 160.

As described above, the action to be performed is selected based, at least in part on the first label, the touch input, and a state associated with a set of radical stroke input rules. A state may be maintained as progress is made through stroke entry.

The set of radical stroke input rules describe the number of strokes used to form a radical, the order of strokes used to form a radical, and the position of a stroke used to form a radical. The state may describe how many rules have been satisfied with respect to a particular radical being input. By way of illustration, the state may be defined by a current number of strokes associated with inputting a current radical, a current order of strokes associated with inputting the current radical, and a current position of strokes associated with inputting the current radical.

While method 100 begins with the soft key already being labeled, in one embodiment, method 100 may also include controlling the touch screen device to label the first soft key with the first label. Additionally, a soft key may be reprogrammable. Therefore, in one embodiment, method 100 may also include controlling the touch screen device to selectively re-label the first soft key with a second, different label.

Figure 7:
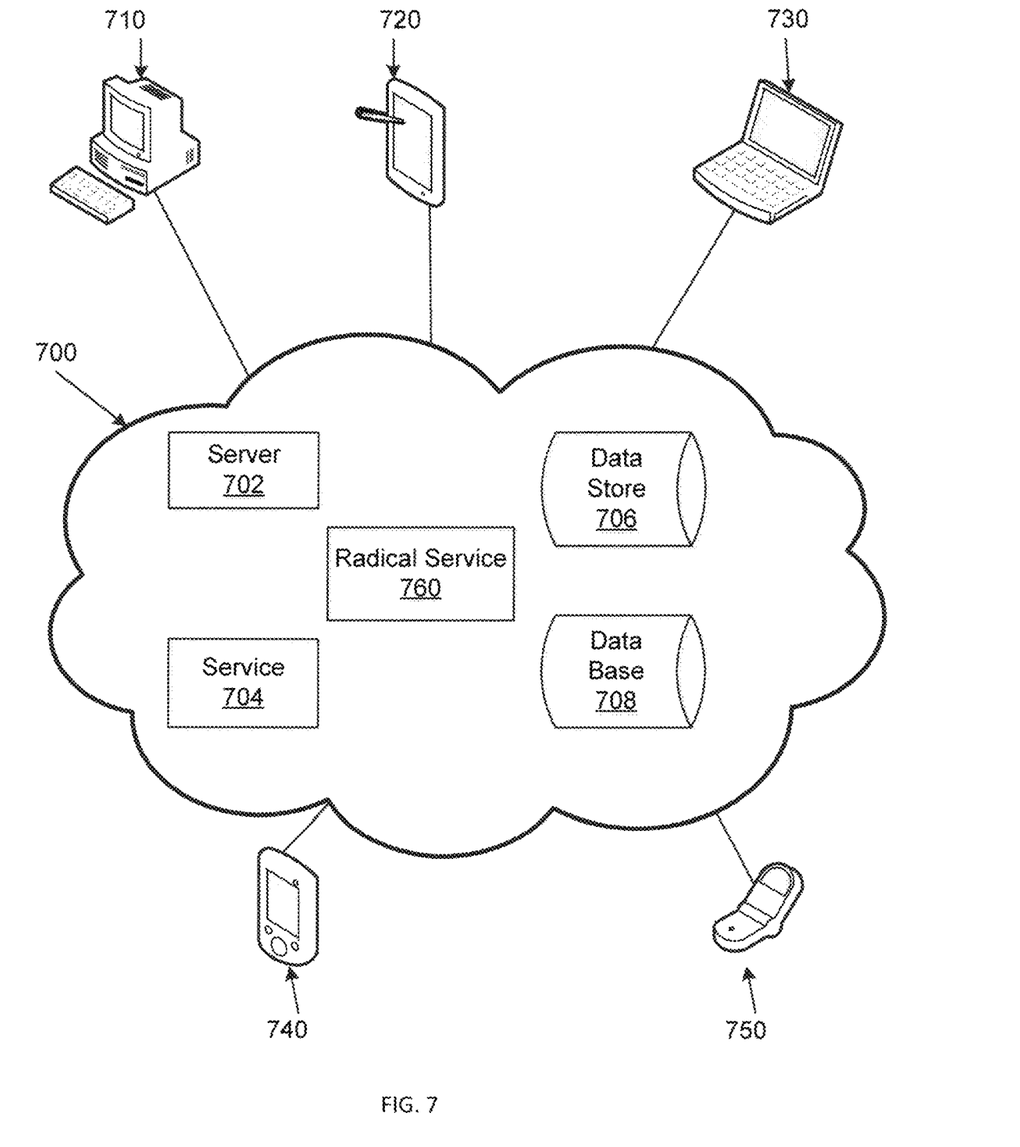
FIG. 7 illustrates an example cloud operating environment.

In one embodiment, the display, selection, and input performed by method 100 may all be performed on a single touch screen device. In another embodiment, labels to display and radicals to display may be stored on or provided from an external device or service. In one embodiment, the service may be located in the cloud. A cloud operating environment is described in Figure seven. Similarly, decisions about labels to display, and decisions about radicals to display or input may be made by an external device or service. Once again, in one embodiment, the service may be located in the cloud. In one embodiment, some processing may be performed on the touch screen device and some processing may be performed by an external device or service. Similarly, some data may be stored on the touch screen device and some data may be stored by an external device or service.

While FIG. 1 illustrates various actions occurring in serial, it is to be appreciated that various actions illustrated in FIG. 1 could occur substantially in parallel. By way of illustration, a first process could display soft keys, a second process could monitor touch inputs, and a third process could control screen update or radical input. While three processes are described, it is to be appreciated that a greater or lesser number of processes could be employed and that lightweight processes, regular processes, threads, and other approaches could be employed.

Figure 2:
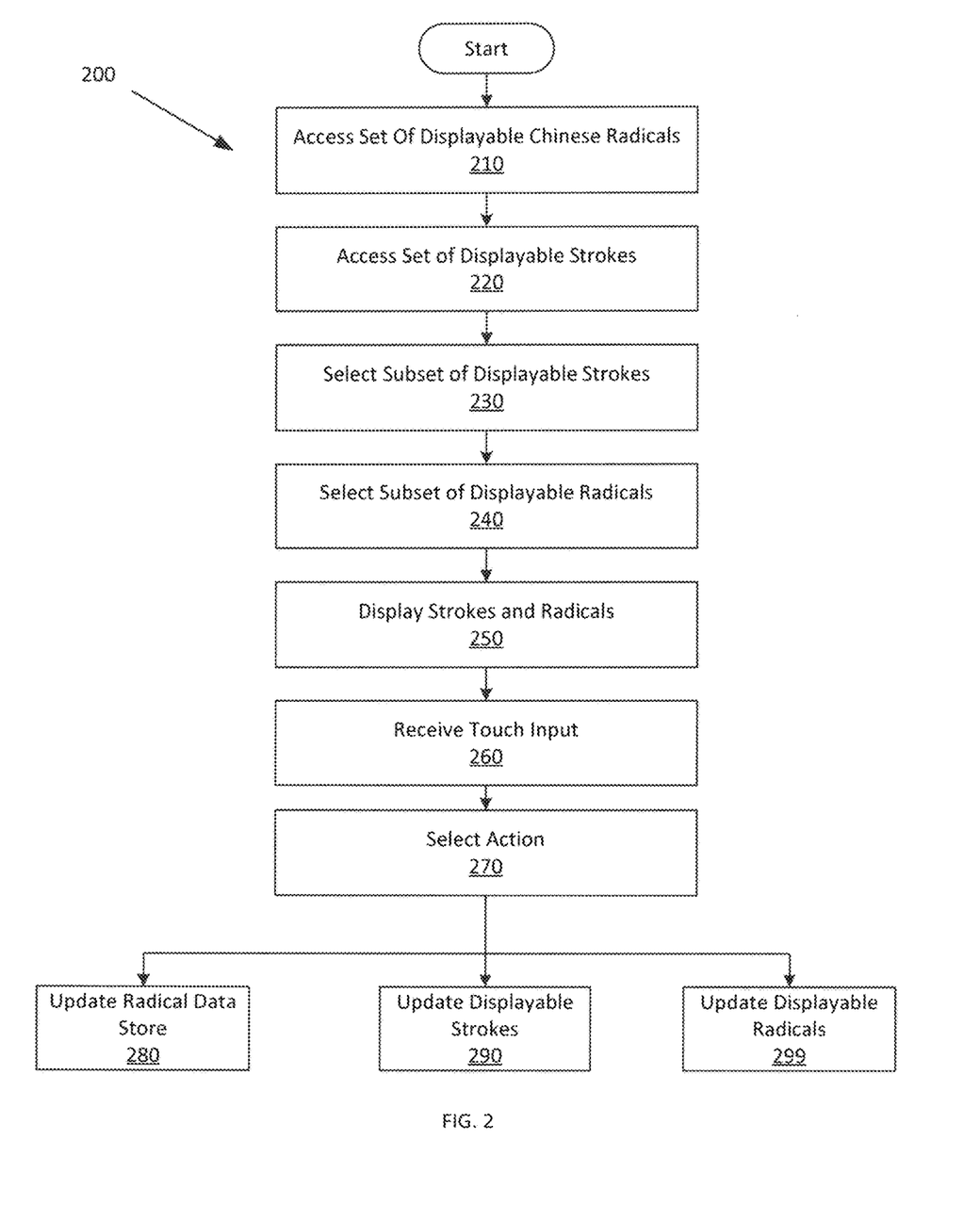
FIG. 2 illustrates an example method associated with inputting a radical on a touch screen device.

FIG. 2 illustrates an example method 200 associated with efficiently inputting a radical. Method 200 includes, at 210, accessing a set of displayable Chinese radicals stored in a radical data store in a touch screen apparatus. Accessing the set of displayable Chinese radicals may include, for example, receiving an address of the radical data store, receiving a pointer to the radical data store, being provided with an object, being provided with an array, being provided with a list or other data structure, or other actions. In different embodiments, the radical data store may be located on the device performing method 200 or may be located external to the device performing method 200.

Method 200 also includes, at 220, accessing a set of displayable strokes stored in a stroke data store in the touch screen apparatus. Accessing the set of displayable strokes may include, for example, receiving an address of the stroke data store, receiving a data structure populated with the displayable strokes, or other actions.

Method 200 may also include, at 230, selecting, from the set of displayable strokes, a subset of displayable strokes to display on the touch screen apparatus. In one embodiment, an initial subset may be selected by pre-determined defaults. In one embodiment, the subset may be determined by a state associated with how many strokes and which strokes have been entered while identifying a radical to be input.

Method 200 may also include, at 240, selecting, from the set of displayable Chinese radicals, a subset of displayable Chinese radicals to display on the touch screen apparatus. In one embodiment, an initial set of radicals may be selected by pre-determined defaults. In one embodiment, the subset may be determined by a state associated with how many strokes and which strokes have been entered while identifying a radical to be input.

With the data stores accessed and the subsets selected, method 200 may proceed, at 250, by displaying the subset of displayable strokes on a first portion of the touch screen apparatus while displaying the subset of displayable Chinese radicals on a second portion of the touch screen apparatus. Figures three, four, and five illustrate example screen shots where strokes and radicals are displayed.

With the strokes and radicals displayed, method 200 may proceed, at 260, by receiving a touch input associated with a displayed member of the subset of displayable strokes or a displayed member of the subset of displayable Chinese radicals. The touch input may be, for example, a flick gesture, a press and hold, a double tap, or other touch screen input.

Method 200 may then proceed, at 270, to select an action to perform. The action to be performed may be selected based, at least in part, on the touch input and the displayed stroke or radical with which the touch input is associated. For example, a flick gesture from a radical to an input area may cause a radical to be input while a press and hold gesture on a stroke may cause the stroke to be input and subsequent possible strokes to be displayed.

Method 200 may include, at 280, updating a radical data store on the touch screen apparatus to include a selected radical. The radical may have been selected by flicking the radical towards an input area, by pressing and holding on the radical, by double tapping on the radical, or in other ways. The radical data store may store the radical until the second part of a Chinese character is input to complete the two-part Chinese character. In different embodiments, the radical data store may be located on the apparatus performing method 200, or may be located external to the apparatus.

Method 200 may include, at 290, updating the subset of displayable strokes displayed on the touch screen apparatus. For example, selecting one stroke may cause some strokes to be excluded from a subset of currently displayable strokes and may cause other strokes to be included in the subset of currently displayable strokes. Which strokes are included or excluded can be determined based, at least in part, on the rules controlling stroke input for radicals and a state to which radical stroke input has advanced.

Method 200 may also include, at 299, updating the subset of displayable Chinese radicals displayed on the touch screen apparatus. For example, selecting one stroke may cause some radicals to be excluded from a subset of currently displayable radicals and may cause other radicals to be included in the subset of currently displayable radicals. Which radicals are included or excluded can be determined based, at least in part, on which radicals are possible or likely based on the current state of radical stroke input.

In one example, a method may be implemented as computer executable instructions. Thus, in one example, a computer-readable storage medium may store computer executable instructions that if executed by a machine (e.g., computer) cause the machine to perform methods described herein including methods 100, or 200. While executable instructions associated with the above methods are described as being stored on a computer-readable storage medium, it is to be appreciated that executable instructions associated with other example methods described herein may also be stored on a computer-readable storage medium. In different embodiments the example methods described herein may be triggered in different ways. In one embodiment, a method may be triggered manually by a user of a mobile computing device. In another example, a method may be triggered automatically when an input action is initiated.

Figure 3:
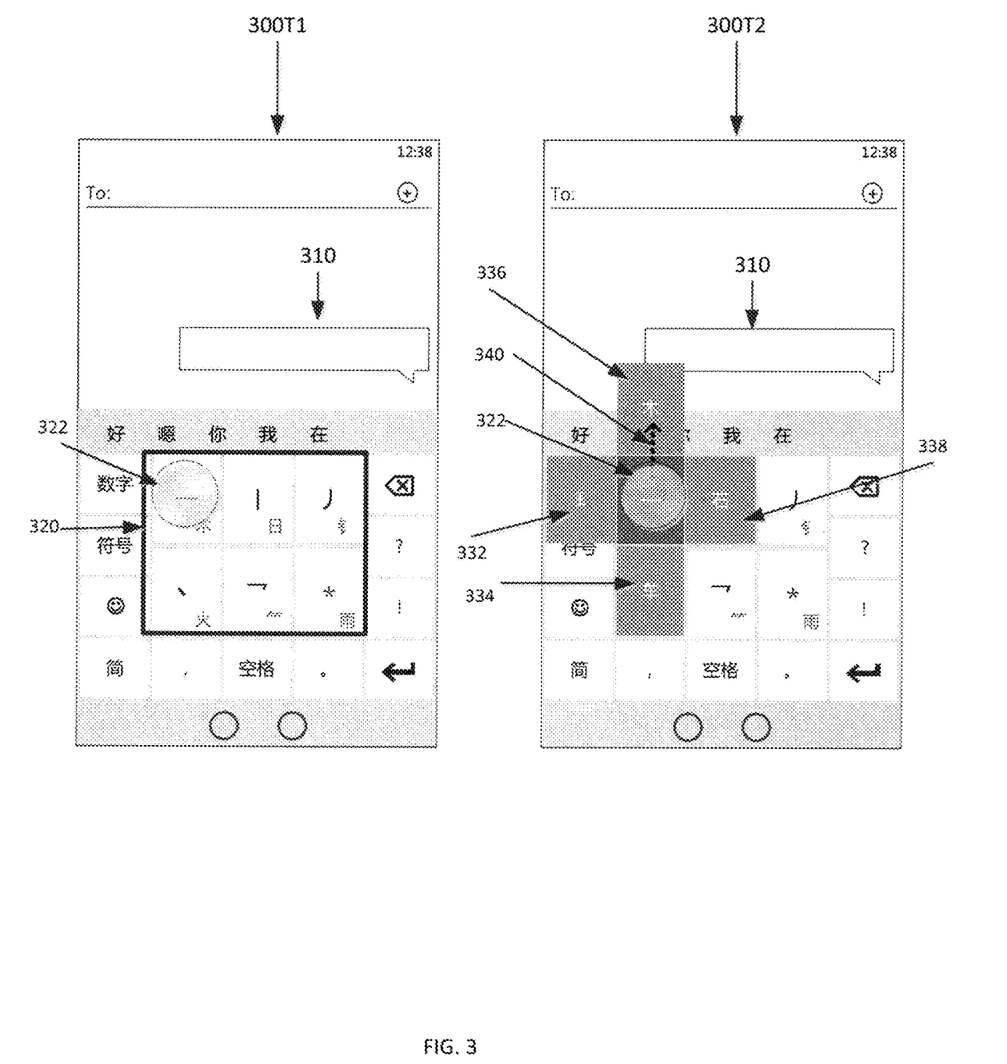
FIG. 3 illustrates example displays associated with inputting a radical on a touch screen device.

FIG. 3 illustrates an example touch screen display associated with inputting a radical on a touch screen device. Example display 300T1 illustrates a touch screen display before a key 322 is pressed and example display 300T2 illustrates a touch screen display after key 322 has been pressed. Both 300T1 and 300T2 have radical input area 310 and key 322.

Display 300T1 shows a set 320 of displayable strokes. While set 320 illustrates six possible strokes, a greater or lesser number of strokes could be displayed. Key 322 is highlighted to represent that a user has touched key 322 to select that stroke. Display 300T2 shows four possible flick candidates 332, 334, 336, and 338 that are displayed after key 322 is selected. While four flick candidates are shown, a greater or lesser number of click candidates could be employed.

A user may use a flick gesture 340 to indicate the radical to be placed into radical input area 310. While a flick gesture 340 is illustrated, different touch inputs may be employed.

Figure 4:
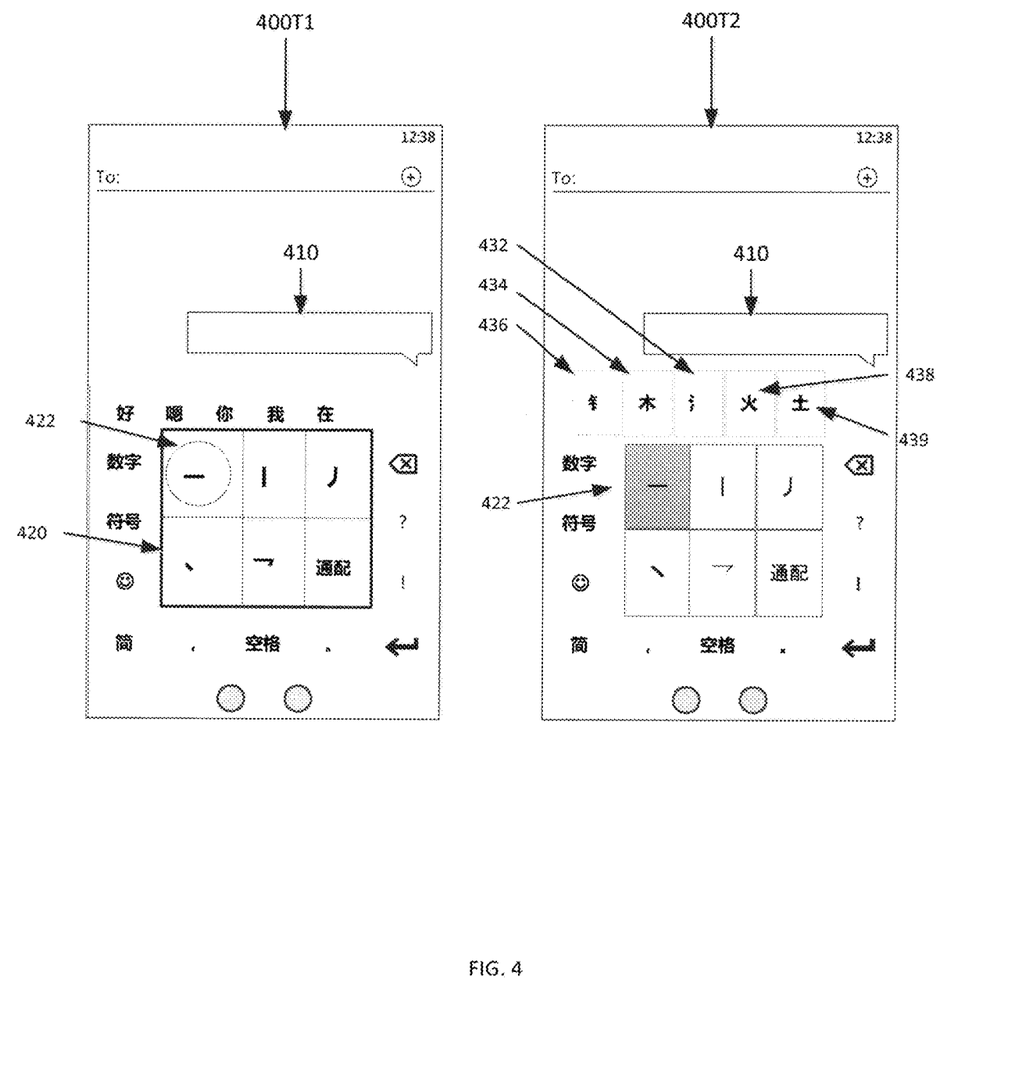
FIG. 4 illustrates example displays associated with inputting a radical on a touch screen device.

FIG. 4 illustrates an example touch screen display associated with inputting a radical on a touch screen device. Example display 400T1 illustrates a touch screen display before a key 422 is pressed and example display 400T2 illustrates a touch screen display after key 422 has been pressed. Both 400T1 and 400T2 have radical input area 410 and key 422.

Display 400T1 shows a set 420 of displayable strokes. While set 420 illustrates six possible strokes, a greater or lesser number of strokes could be displayed. Key 422 is highlighted to represent that a user has touched key 422 to select that stroke. In one embodiment, key 422 may be pressed and held causing stroke collections or radical candidates to be displayed. Display 400T2 shows five possible stroke collections or radical candidates 432, 434, 436, 438, and 439 that are displayed after key 422 is selected. While five candidates are shown, a greater or lesser number of candidates could be employed. A user may then use a second touch input to select the stroke collection or radical. If a radical is selected, then the radical may be moved to radical input area 410. If a stroke collection is selected, then the set 420 of strokes may be updated.

Figure 5:
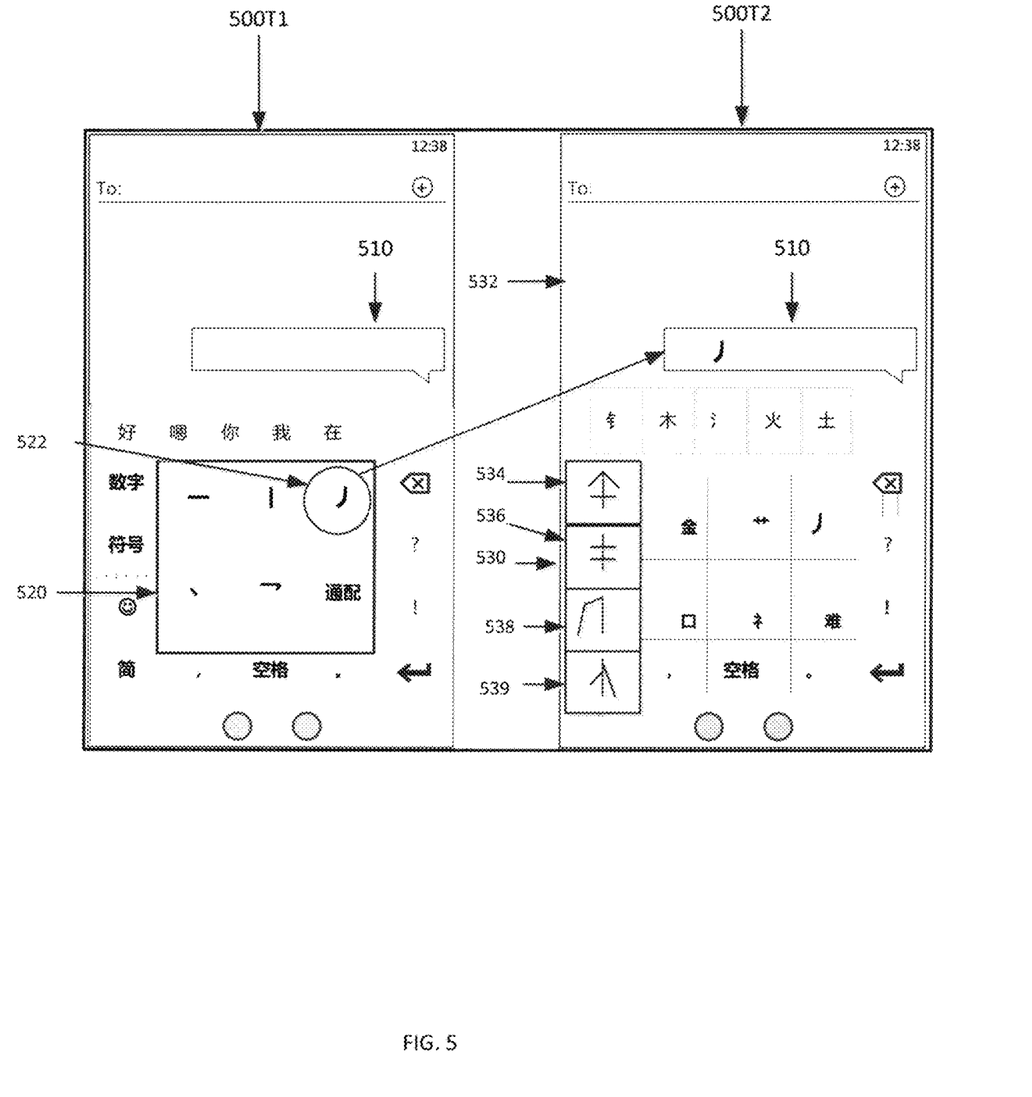
FIG. 5 illustrates example displays associated with inputting a radical on a touch screen device.

FIG. 5 illustrates an example touch screen display associated with inputting a radical on a touch screen device. Example display 500T1 illustrates a touch screen display before a key 522 is pressed and example display 500T2 illustrates a touch screen display after key 522 has been pressed and the radical stroke associated with key 522 has been added to stroke input area 510. Both 500T1 and 500T2 have stroke input area 510 and key 522.

Display 500T1 shows a set 520 of displayable strokes. While set 520 illustrates six possible strokes, a greater or lesser number of strokes could be displayed. Key 522 is highlighted to represent that a user has performed a touch input on key 522 to select the stroke associated with key 522. Performing the touch input on key 522 causes that stroke to be entered in stroke input area 510. Performing the touch input on key 522 also causes area 530 to be displayed or updated. Area 530 may be referred to as a radical picker.

Display 500T2 shows area 530 as having four possible radical candidates 532, 534, 536, and 538. Display 500T2 also shows area 530 with a scroll indicator 539 that indicates that more radicals are available for display in 530. While four candidates and a scroll indicator are shown, a greater or lesser number of candidates and scroll indicators could be employed. A user may use a second touch input to select a radical from radical picker 530. If a radical is selected, then the radical may be moved to input area 510.

Figure 6:
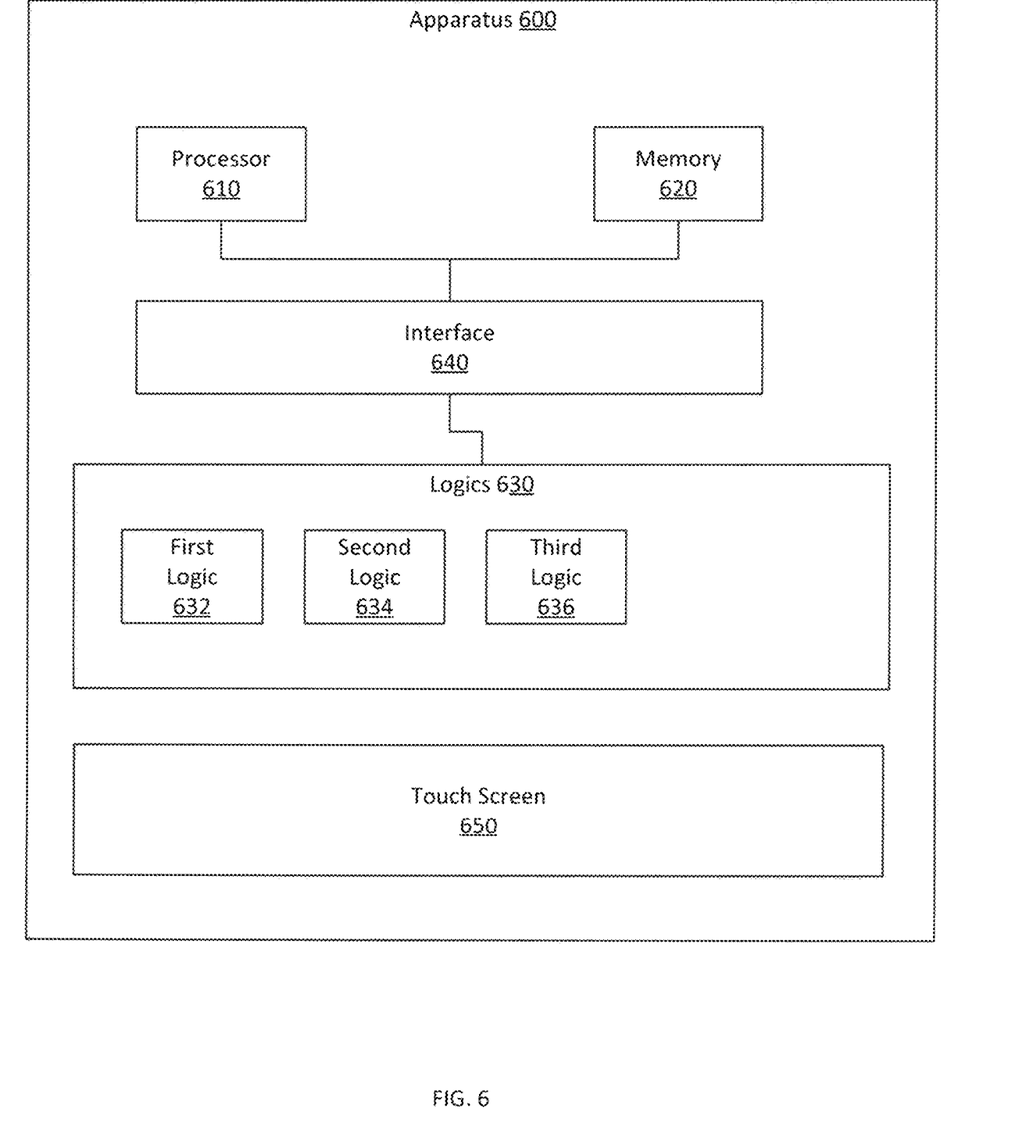
FIG. 6 illustrates an example apparatus configured to input a radical on a touch screen device.

FIG. 6 illustrates an apparatus 600 that includes a processor 610, a memory 620, a set 630 of logics, a touch screen 650, and an interface 640 that connects the processor 610, the memory 620, the touch screen 650, and the set 630 of logics. In one embodiment the apparatus 600 may be a general purpose computer that has been transformed into a special purpose computer through the inclusion of the set 630 of logics. The set 630 of logics may be configured to facilitate efficient input of Chinese radicals through touch screen 650. In different embodiments, apparatus 600 may be a smart phone, a tablet computer, a laptop computer, or other computing device. In one embodiment, the methods described herein may be performed by apparatus 600. Apparatus 600 may interact with other apparatus, processes, and services through, for example, a computer network.

The set 630 of logics may include a first logic 632 that is configured to control the apparatus 600 to display on the touch screen 650 one or more selected strokes associated with one or more selected Chinese radicals. Images of the strokes to display may be stored, for example, in memory 620. First logic 632 may select a subset of the strokes available in memory 620.

The set 630 of logics may also include a second logic 634 that is configured to control the apparatus 600 to display on the touch screen 650 one or more selected Chinese radicals. Images of the Chinese radicals may be stored, for example, in memory 620. Second logic 632 may select a subset of the radicals available in memory 620.

The set 620 of logics may also include a third logic 636 that is configured to control the first logic 632 and the second logic 634 based, at least in part, on an input detected on the touch screen 650. In one example, the third logic 636 controls the first logic 632 to select strokes to display based, at least in part, on a previously displayed stroke. Similarly, the third logic 636 may control the second logic 634 to select Chinese radicals to display based, at least in part, on a previously displayed stroke. The third logic 636 may also be configured to input a Chinese radical into a radical data store based on an input detected on touch screen 650. In one example, the radical data store may be stored in the memory 620. The touch screen 650 may be configured to receive touch screen inputs including, but not limited to, a flick gesture, a press and hold, a double tap, a drag and drop, an expand gesture, and a contract gesture.

In different embodiments, some processing may be performed on the apparatus 600 and some processing may be performed by an external service or apparatus. Thus, in one embodiment, apparatus 600 may also include a communication circuit that is configured to communicate with an external source to facilitate receipt or transmission of items including, but not limited to, a stroke to display, a radical to display, a radical to input, and a decision concerning a radical to input. In one example, the first logic 632 may be configured to select strokes on the apparatus 600. But in another example, the first logic 632 may be configured to request strokes to display from a service located off the apparatus 600. Similarly, the second logic 634 may be configured to select radicals on the apparatus 600 or may be configured to request radicals to display from a service located off the apparatus 600.

"Computer-readable storage medium", as used herein, refers to a medium that stores instructions or data. "Computer-readable storage medium" does not refer to propagated signals. A computer-readable storage medium may take forms, including, but not limited to, non-volatile media, and volatile media. Non-volatile media may include, for example, optical disks, magnetic disks, tapes, and other media. Volatile media may include, for example, semiconductor memories, dynamic memory, and other media. Common forms of a computer-readable storage medium may include, but are not limited to, a floppy disk, a flexible disk, a hard disk, a magnetic tape, other magnetic medium, an application specific integrated circuit (ASIC), a compact disk (CD), other optical medium, a random access memory (RAM), a read only memory (ROM), a memory chip or card, a memory stick, and other media from which a computer, a processor or other electronic device can read.

FIG. 7 illustrates an example cloud operating environment 700. A cloud operating environment 700 supports delivering computing, processing, storage, data management, applications, and other functionality as an abstract service rather than as a standalone product. Services may be provided by virtual servers that may be implemented as one or more processes on one or more computing devices. In some embodiments, processes may migrate between servers without disrupting the cloud service. In the cloud, shared resources (e.g., computing, storage) may be provided to computers including servers, clients, and mobile devices, over a network. Different networks (e.g., Ethernet, Wi-Fi, 802.x, cellular) may be used to access cloud services. Users interacting with the cloud may not need to know the particulars (e.g., location, name, server, database) of a device that is actually providing the service (e.g., computing, storage). Users may access cloud services via, for example, a web browser, a thin client, a mobile application, or in other ways.

FIG. 7 illustrates an example radical service 760 residing in the cloud 700. The radical service 760 may rely on a server 702 or service 704 to perform processing and may rely on a data store 706 or database 708 to store data. While a single server 702, a single service 704, a single data store 706, and a single database 708 are illustrated, multiple instances of servers, services, data stores, and databases may reside in cloud 700 and may, therefore, be used by the radical service 760.

FIG. 7 illustrates various devices accessing the radical service 760 in the cloud 700. The devices include a computer 710, a tablet 720, a laptop computer 730, a personal digital assistant 740, and a mobile device (e.g., cellular phone, satellite phone) 750. The radical service 760 facilitates efficiently inputting Chinese radicals using a touch screen device. Thus, it is possible that different users at different locations using different devices may access the radical service 760 through different networks or interfaces. In one example, the radical service 760 may be accessed by a mobile device 750. In another example, portions of radical service 760 may reside on a mobile device 750.

Figure 8:
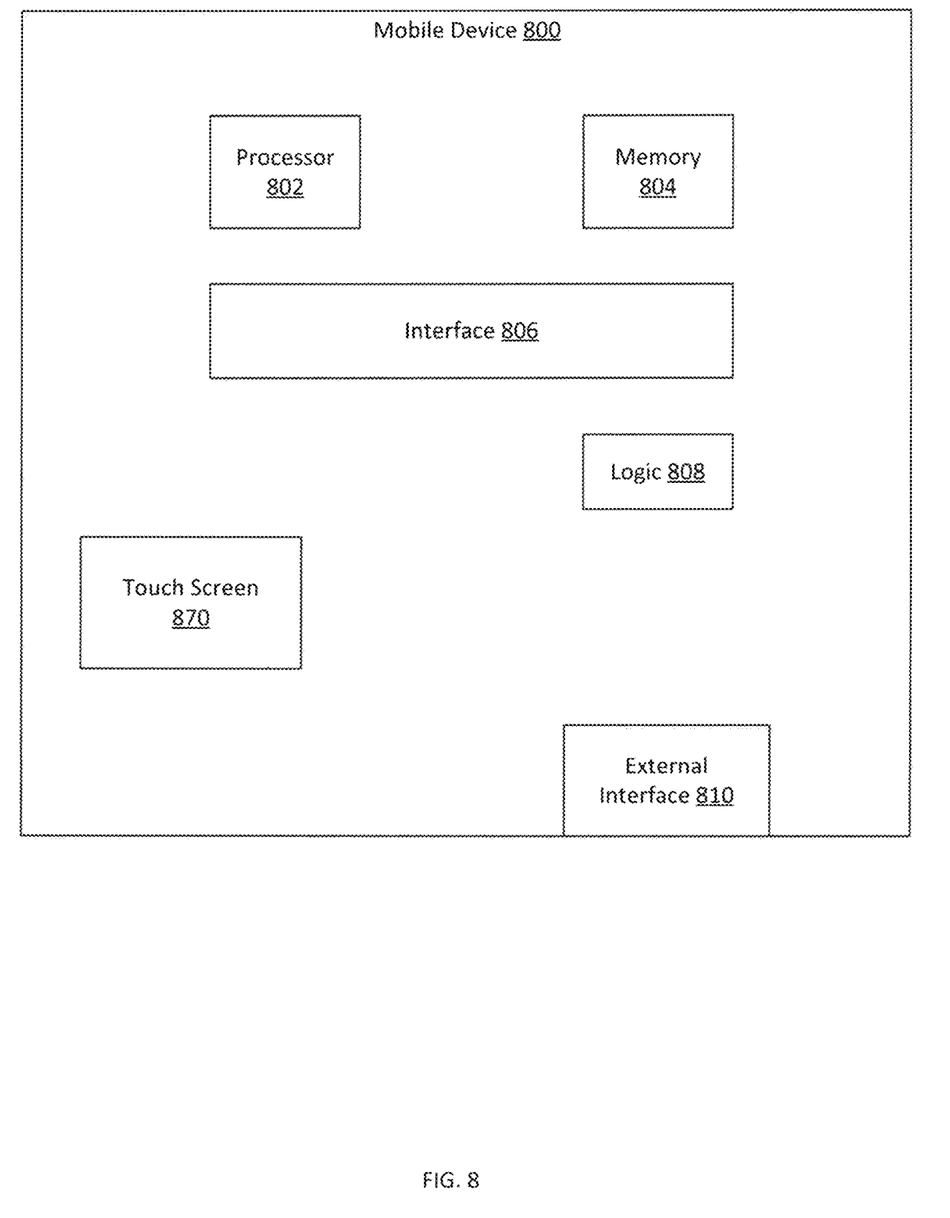
FIG. 8 illustrates an example mobile computing device configured to input a radical through a touch screen.

FIG. 8 illustrates an example mobile device 800. Mobile device 800 includes a processor 802, a memory 804, a logic 808, a touch screen 870, and an external interface 810 that may be connected by an interface 806. Mobile device 800 may be, for example, a cellular telephone, a network telephone, a satellite telephone, or other device. Generally describing an example configuration of the mobile device 800, the processor 802 may be a variety of various processors including dual microprocessor and other multi-processor architectures. The memory 804 may include volatile memory or non-volatile memory. Non-volatile memory may include, for example, read only memory (ROM), programmable ROM (PROM), and other memory. Volatile memory may include, for example, random access memory (RAM), dynamic RAM (DRAM), and other memory. The memory 804 can store an operating system that controls and allocates resources of the mobile device 800. The memory 804 may also store strokes, images of strokes, radicals, images of radicals, and other information associated with inputting radicals.

The interface 806 may be a single internal bus interconnect architecture or other bus or mesh architectures. While a single bus is illustrated, it is to be appreciated that the mobile device 800 may communicate with various devices, logics, and peripherals using other busses (e.g., PCIE, 1394, USB, Ethernet). The interface 806 can be types including, for example, a memory bus, a memory controller, a peripheral bus, an external bus, a crossbar switch, or a local bus.

The mobile device 800 can operate in a network environment and thus may be connected to a network through network devices via the external interfaces 810. The mobile device 800 may be logically connected to remote computers through the network and the network devices. Through the network, the mobile device 800 may also be connected to services (e.g., radical service 760) provided in the cloud (e.g., cloud 700, FIG. 7). Networks with which the mobile device 800 may interact include, but are not limited to, a local area network (LAN), a wide area network (WAN), a telephony network, a telephony system, a cellular system, a satellite system, and other networks.

Mobile device 800 may include a special purpose logic 808 that is configured to provide a functionality for the mobile device 800. For example, logic 808 may provide a client for interacting with a radical service (e.g., service 760. FIG. 7), or for performing efficient input of Chinese radicals using touch screen 870.

The following includes definitions of selected terms employed herein. The definitions include various examples or forms of components that fall within the scope of a term and that may be used for implementation. The examples are not intended to be limiting. Both singular and plural forms of terms may be within the definitions.

References to "one embodiment", "an embodiment", "one example", and "an example" indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Data store", as used herein, refers to a physical or logical entity that can store data. A data store may be, for example, a database, a table, a file, a list, a queue, a heap, a memory, a register, and other physical repository. In different examples, a data store may reside in one logical or physical entity or may be distributed between two or more logical or physical entities.

"Logic", as used herein, includes but is not limited to hardware, firmware, software in execution on a machine, or combinations of each to perform a function(s) or an action(s), or to cause a function or action from another logic, method, or system. Logic may include a software controlled microprocessor, a discrete logic (e.g., ASIC), an analog circuit, a digital circuit, a programmed logic device, a memory device containing instructions, and other physical devices. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the Applicant intends to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is employed herein, (e.g., a data store configured to store one or more of, A, B, and C) it is intended to convey the set of possibilities A, B, C, AB, AC, BC, or ABC (e.g., the data store may store only A, only B, only C, A&B, A&C, B&C, or A&B&C). It is not intended to require one of A, one of B, and one of C. When the applicants intend to indicate "at least one of A, at least one of B, and at least one of C", then the phrasing "at least one of A, at least one of B, and at least one of C" will be employed.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing the claims.

The invention claimed is:

1. A computer-readable storage medium storing computer-executable instructions that, based on execution by a computer, configure the computer to:
   display, on a touch screen device, a first soft key labeled with a first label, the first label representing a portion of a radical;
   accept a touch input associated with the soft key, the touch input corresponding to at least one of, a double tap, a press and hold, a flick, an expand gesture, or a contract gesture; and
   select an action for the touch screen device to perform based, at least in part, on the first label, a state associated with a set of radical stroke input rules, and the touch input, where the action is at least one of:
      inputting the radical into a radical data store; and
      updating a set of complete radicals displayed on the touch screen device by a radical picker,
   the set of radical stroke input rules controlling at least one of, a number of strokes used to form a radical, an order of strokes used to form a radical, or a position of a stroke used to form a radical, and
   the state being defined by at least one of, a current number of strokes associated with inputting a current radical, a current order of strokes associated with inputting the current radical, or a current position of strokes associated with inputting the current radical.

2. The computer-readable storage medium of claim 1, where the first label is a single stroke associated with the radical.

3. The computer-readable storage medium of claim 2, where the single stroke is one of, a Chinese one stroke, a Chinese line stroke, a Chinese dot stroke, a Chinese slash stroke, a Chinese second stroke and a Chinese hook stroke.

4. The computer-readable storage medium of claim 1, where the first label is a subset of a set of strokes associated with the radical.

5. The computer-readable storage medium of claim 1, where the radical is one of, a Chinese radical, a Japanese radical and a Korean radical.

6. The computer-readable storage medium of claim 1, where the computer-executable instructions configure the computer to control the touch screen device to display a second soft key with a second label having more strokes than the first label upon detecting the expand gesture.

7. The computer-readable storage medium of claim 1, where the computer-executable instructions configure the computer to control the touch screen device to display a second soft key with a second label having fewer strokes than the first label upon detecting the contract gesture.

8. The computer-readable storage medium of claim 1, where the computer-executable instructions configure the computer to:
   control the touch screen device to label the first soft key with the first label; and
   control the touch screen device to selectively re-label the first soft key with a second label.

9. The computer-readable storage medium of claim 1, where the computer-executable instructions configure the computer to control one or more of, a smart phone, a tablet computer, a laptop computer, an appliance, a personal digital assistant, a game device, and a television to display the first soft key.

10. A computer-readable storage medium storing computer-executable instructions that, based on execution by a computer configure the computer to:
   access a set of displayable Chinese radicals stored in a radical data store associated with a touch screen apparatus;
   access a set of displayable strokes stored in a stroke data store associated with the touch screen apparatus;
   select, from the set of displayable strokes, a subset of displayable strokes to display on the touch screen apparatus;
   select, from the set of displayable Chinese radicals, a subset of displayable Chinese radicals to display on the touch screen apparatus;
   display the subset of displayable strokes on a first portion of the touch screen apparatus while also displaying the subset of displayable Chinese radicals on a second portion of the touch screen apparatus;
   receive a touch input associated with a member of the subset of displayable strokes or a member of the subset of displayable Chinese radicals, the touch input corresponding to at least one of an expand gesture or a contract gesture; and control the touch screen apparatus to perform an action based, at least in part, on the touch input and a state associated with a set of radical stroke input rules, the action at least corresponding to:

based at least on a determination that the touch input is the expand gesture, controlling the touch screen apparatus to display a soft key with a label having more strokes than the member of the subset of displayable strokes; or based at least on a determination that the touch input is the contract gesture, controlling the touch screen apparatus to display a soft key with a label having fewer strokes than the member of the subset of displayable strokes.

11. An apparatus, comprising:
a processor;
memory;
a touch screen;
a set of logics configured to control input of Chinese radicals; and
an interface configured to operationally couple the processor, the memory, the touch screen, and the set of logics;
the set of logics comprising:
a first logic that is configured to control the apparatus to display on the touch screen one or more selected strokes associated with one or more selected Chinese radicals;
a second logic that is configured to control the apparatus to display on the touch screen one or more selected Chinese radicals; and
a third logic that is configured to control the first logic and the second logic based, at least in part, on an input detected on the touch screen,
the third logic controlling the first logic to select strokes to display based, at least in part, on a previously displayed stroke,
the third logic controlling the second logic to select Chinese radicals to display based, at least in part, on the previously displayed stroke and a state associated with a set of radical stroke input rules, and
the set of radical stroke input rules describing at least one of a number of strokes used to form a radical, an order of strokes used to form a radical, or a position of a stroke used to form a radical.

12. The apparatus of claim 11, the third logic being configured to input a Chinese radical into a radical data store in the memory based on the input detected on the touch screen.

13. The apparatus of claim 12, the input detected on the touch screen being one of, a flick gesture, a press and hold, a double tap, a drag and drop, an expand gesture, and a contract gesture.

14. The apparatus of claim 13, comprising a communication circuit that receives, from an external source, one or more of, a stroke to display, a radical to display, a radical to input, and a decision concerning a radical to input.

15. The computer-readable storage medium of claim 1, wherein the radical comprises a plurality of strokes having a fixed stroke sequence and is shared by at least two characters.

* * * * *